March 10, 1953  W. H. HARSTICK ET AL  2,630,712
PRESSURE OPERATED MILK METERING DEVICE
Filed April 15, 1950  3 Sheets-Sheet 1
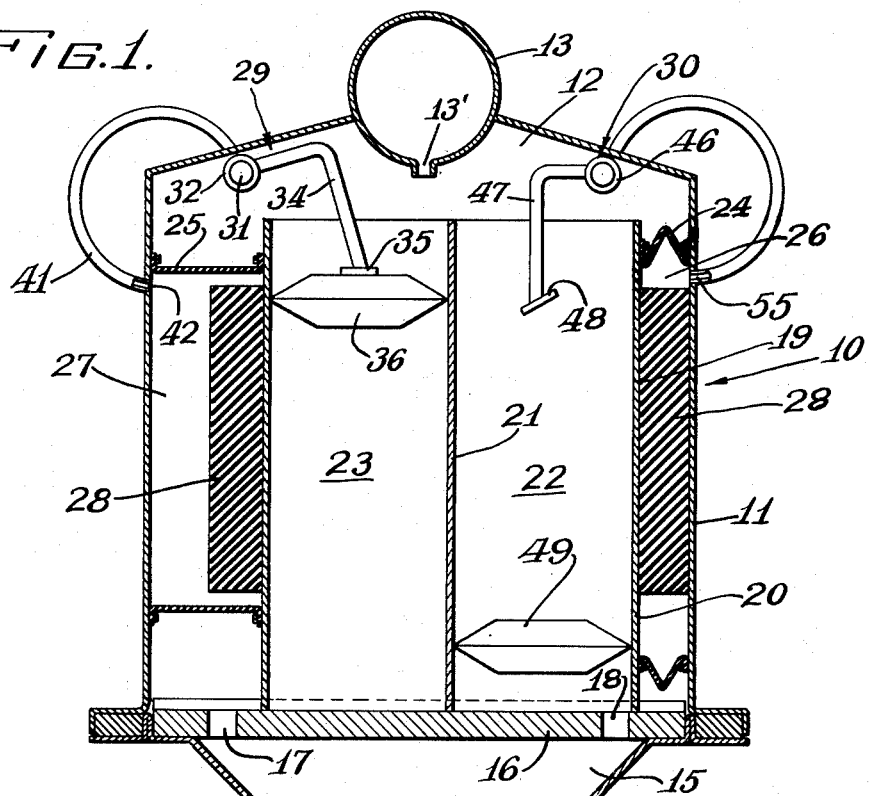
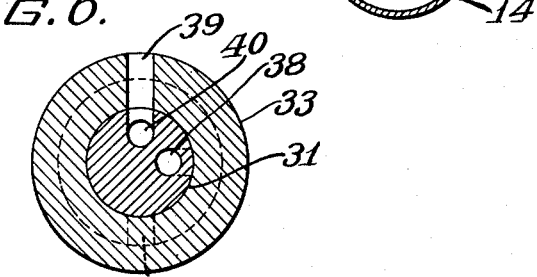
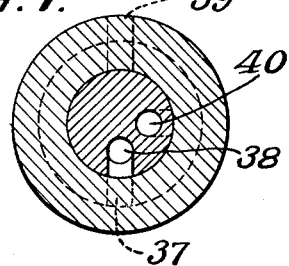
Inventors:
William H. Harstick
Harold W. Hein
Paul O. Pippel
Atty.

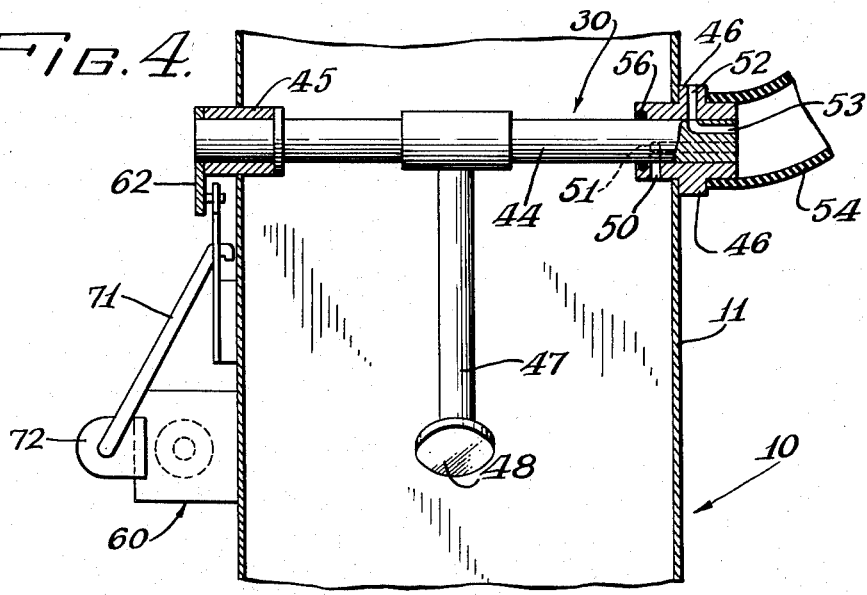
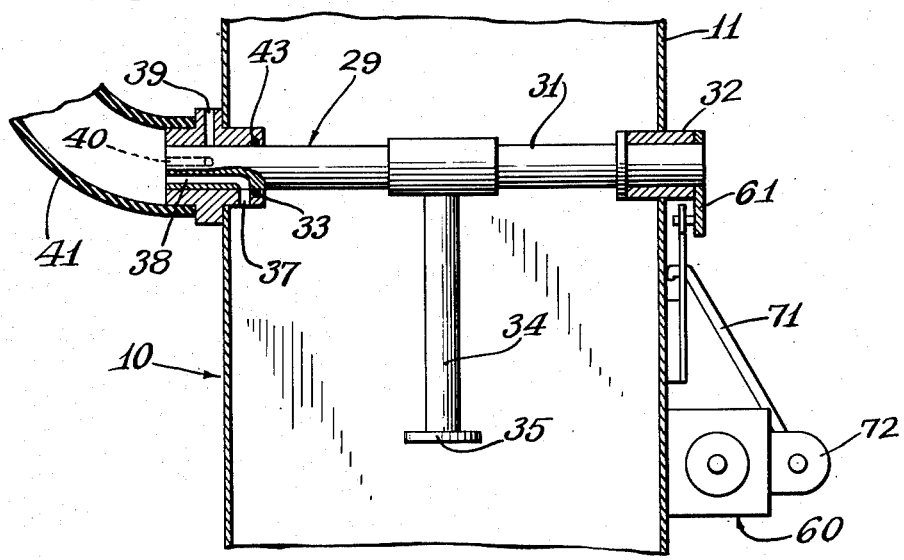

March 10, 1953 W. H. HARSTICK ET AL 2,630,712
PRESSURE OPERATED MILK METERING DEVICE
Filed April 15, 1950 3 Sheets-Sheet 3
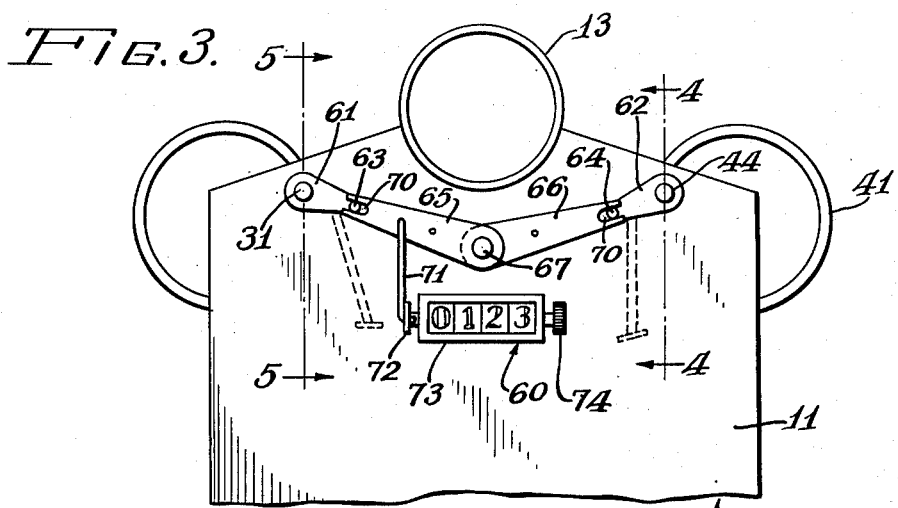
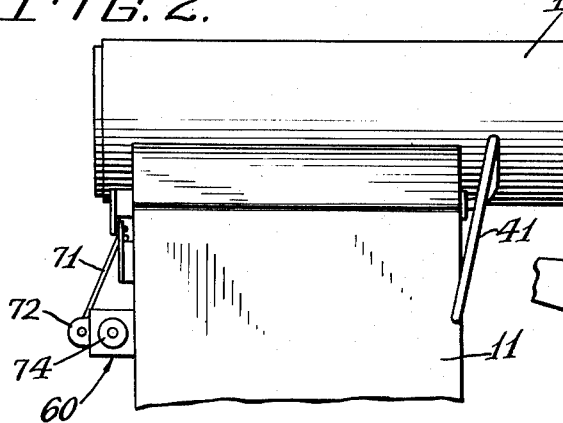
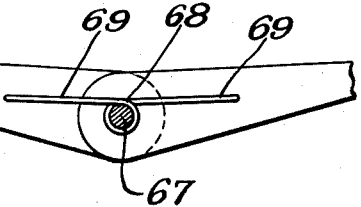
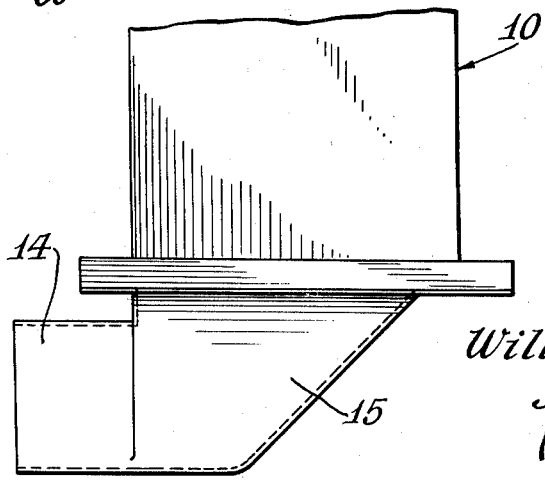
Inventors:
William H. Harstick
Harold W. Hein
Paul O. Pippel
Atty.

Patented Mar. 10, 1953

2,630,712

UNITED STATES PATENT OFFICE 2,630,712

PRESSURE OPERATED MILK METERING DEVICE

William H. Harstick, Oak Park, and Harold W. Hein, Chicago, Ill., assignors to International Harvester Company, a corporation of New Jersey Application April 15, 1950, Serial No. 156,164

12 Claims. (Cl. 73—219)

This invention relates to a flow meter or liquid measuring device. More specifically, the invention relates to a milk metering unit adapted to be placed in the pipe line of a milking system for measuring the milk flow through said system, the unit being operable by pressure normally present in a system of that type.

It is a prime object of this invention to provide an improved vacuum or pressure-operated milk metering unit readily adapted for use with a pipe line milking system.

Another object is to provide a measuring unit enclosed in a vacuum sealed casing, the casing being connectable to conduits of a pipe line milking system.

A still further object is to provide a measuring unit having a casing provided with a slidable measuring chamber, the chamber being adapted to be alternately moved into a position for receiving milk and into a position for discharging milk, the unit also including an indicating device designed to measure the number of times the measuring unit is moved, thereby indicating the quantity of milk which has traveled through the measuring unit.

A still further object is to provide a measuring device that includes diaphragms designed to alternately be placed into communication with the vacuum line whereby the diaphragms are effective to actuate and move a measuring unit disposed within the device.

These and further objects will become more readily apparent from a reading of the description and the claims in connection with the accompanying sheets of drawings.

In the drawings:

Fig. 1 is a cross-sectional view, in elevation, through a flow meter or liquid measuring device.

Fig. 2 is an end elevational view of a measuring device.

Fig. 3 is a front view showing a portion of a measuring device including an actuating or indicating mechanism.

Fig. 4 is a sectional view through a measuring unit taken along the line 4—4 of Fig. 3.

Fig. 5 is a sectional view of the measuring device taken along the line 5—5 of Fig. 3.

Fig. 6 is a sectional view through a valve mechanism showing the mechanism in one position during operation of a measuring device.

Fig. 7 is a view through the valve mechanism shown in Fig. 6 showing the mechanism in another position during its operation.

Fig. 8 is a detail view showing a portion of an indicating or counting mechanism for a flow measuring device.

Referring particularly to Figs. 1, 2 and 3, a flow meter or liquid measuring device is generally referred to by the reference character 10. The device 10 includes a casing 11 having a vacuum chamber 12. The chamber 12 is at its upper end provided with an inlet conduit 13 having an opening 13' in communication with the upper end of the vacuum chamber 12. The inlet conduit 13 is adapted to be placed into communicating connection with the pipe line of a pipe line milking system (not shown). The lower end of the casing 11 is provided with an outlet conduit 14 which is in communication with a discharge chamber 15. The outlet conduit 14 is also adapted to be connected to the pipe line of a pipe line milking system. The casing 11 is suitably sealed from the atmosphere so that the chamber 12 is under the same vacuum that may normally be found in a pipe line milking system. It is well known in the art that pipe line milking systems are so connected that a vacuum exists within the conduit which normally runs to the milking machines that derive the milk from the animal. Thus the vacuum existing in the system also exists within the casing 11.

The vacuum chamber 12 is separated from the discharge chamber 15 by means of a horizontal wall 16, the wall having oppositely disposed outlet ports 17 and 18 which provide for communication between the two chambers 12 and 15. A measuring unit 19 is supported upon the wall 16. The measuring unit 19 includes a rectangular container 20 which is open at its upper and lower ends. A partition wall 21 is positioned within the container 20, the wall 21 serving to separate measuring chambers 22 and 23.

As best shown in Fig. 1, the container 20 may slide on and relative to the wall 16, the movement resulting from the action of diaphragms 24 and 25 which are constructed of a flexible material such as rubber, leather, etc. The diaphragms 24 and 25 are of annular shape and are respectively connected to opposite sides of the measuring unit 19, each diaphragm also being secured to adjacent portions of the casing 11. The diaphragms are sealed with respect to the vacuum chamber 12 and in turn are respectively provided with diaphragm chambers 26 and 27. Each portion of the container 20 within the diaphragm chambers 26 and 27 is provided with a bumper 28 designed to act as a stop and to cushion the impact when the container is reciprocated or slidably moved within the casing 11 into engagement with the casing 11. Each diaphragm chamber 26 and 27 is arranged to be placed under a vacuum depression by proper connection to the vacuum chamber 12. This depression of each diaphragm chamber is effected by valve mechanisms generally designated by the reference characters 29 and 30. Both valve mechanisms employed are identical in structure but for the purpose of clarity in the description and operation separate reference characters will be given to the respective parts of each mechanism.

The valve mechanism 29 includes a shaft 31 which extends transversely across the casing 11. The shaft 31 is supported on the casing by bearings 32 and 33 as best shown in Fig. 5. An arm 34 is connected to the shaft 31 to rotate therewith. The arm 34 includes at its lower end a contact plate 35 as best shown in Fig. 1, the contact plate 35 projecting down into the chamber 23 of the measuring unit 19. As shown in Fig. 1, the chamber 23 is provided with a float 36, the float 36 being adapted to rise and recede within the chamber in response to the liquid level therein.

Referring particularly to Figs. 5, 6, and 7, the valve mechanism 29 is described in detail. The bearing 33 is provided with a port 37 which communicates with the vacuum chamber 12 of the casing 11. The port 37 is adapted to be placed into communication with a bore 38 which is formed in the shaft 31. The bore 38 opens outwardly from the end of the shaft 31. An air port 39 is also provided in the bearing 33, this air port being open to the atmosphere and also being adapted to communicate with a bore 40 opening outwardly from the end of the shaft 31. A flexible conduit 41 is connected to the end of the bearing 33, the flexible conduit being in direct communication with the bores 38 and 40. The flexible conduit 41 is also in communication with the diaphragm 27 by the connection designated 42 as best shown in Fig. 1. An air-tight seal between the bearing 33 and the shaft 31 is effected by means of O-ring 43.

The valve mechanism 30 as indicated before is similar to the valve mechanism 29. This mechanism 30 includes a shaft 44 as best shown in Fig. 4 which extends transversely across the casing 11. The shaft 44 is suitably journaled on bearings 45 and 46. An arm 47 is connected to the shaft, the arm including a contact plate 48 as best indicated in Fig. 1. The contact plate 48 may be engaged by a float 49 positioned within the chamber 22 of the container 20.

A port 50 is in communication with the vacuum chamber 12, this port being adapted to be placed into registry with a bore 51 extending within the shaft 44 and opening outwardly from the end of the shaft. An air port 52 is provided with the bearing 46, the air port being opened into the atmosphere. A bore 53 provided in the shaft 44 is adapted to register with the air port 52, the bore 53 opening outwardly from the end of the shaft 44. A flexible conduit 54 is connected over one end of the bearing 46 whereby direct communication is established between the interior of the conduit and the bores 51 and 53. The conduit 54 as best shown in Fig. 1 is in communication with the diaphragm chamber 26 as indicated at 55. An O-ring 56 is positioned between the shaft 44 and the bearing 46 in order to seal the vacuum chamber 12 from the atmosphere.

As best shown in Figs. 3 and 8, an indicating or counting mechanism 60 is positioned at one side of the casing 11. The indicating mechanism 60 includes levers 61 and 62 respectively connected to the shafts 31 and 44 of the respective valve mechanisms 29 and 30. The levers 61 and 62 are respectively provided with pins 63 and 64. A pair of toggle arms 65 and 66 are hingedly connected together by means of a pin 67. A coil spring 68 having spring fingers 69 is effective to keep the arms in a relatively outstretched or horizontal position. Each arm 65 and 66 is provided with a slot at its outer end, the slots being engaged by the pins 63 and 64. A link 71 is connected to the arm 65, the link 71 being hingedly connected to a tripping lever 72. The tripping lever 72 is connected to a counter 73 having the conventional type of regulating knob 74. The type of counter utilized in the present disclosure can be of any conventional form and detailed description of the same is not deemed necessary.

*Operation*

During the operation a vacuum exists within the pipe line milker system and the vacuum chamber 12 is also under a vacuum. As best shown in Fig. 1, milk flows in through the inlet conduit 13 into the chamber 23 whereupon the float 36 rises with the liquid level within the chamber. In this first position of the measuring unit 19 the diaphragm 24 is in a collapsed position with the bumper 28 adjacent one of the side walls of the container. Liquid continues to rise in the measuring chamber 23 since the outlet 17 within the wall 16 is positioned in offset relation or out of communication with respect to the chamber 23. The float 36 thereupon engages the plate 35 thereby pushing upwardly on the arm 34. Rotation of the shaft 31 brings the bore 38 into communication with the port 37 as best shown in Figs. 5 and 7. In this position the bore 40 and the atmosphere port 39 are out of communication and communication between the vacuum chamber 12 and the conduit 41 is established. In view of this communication the diaphragm chamber 27 is under a vacuum tending to collapse the diaphragm 25.

After the diaphragm 25 collapses the measuring container 20 is moved into a position wherein the port 17 is in communication with the chamber 23 and the liquid within the chamber 23 is free to drain into the discharge chamber 15 and into the conduit 14. In this position the chamber 23 has moved out of registry with respect to the opening 13' and the chamber 22 is in communication with the said opening. As the liquid is drained out of the chamber 23 the valve 36 of course recedes with the liquid level. The arm 34 is forced downwardly into its previous non-operating position by means of spring 68 which normally urges the arms 65 and 66 to pivot downwardly with respect to each other. As the arm 34 is urged downwardly to its former position the shaft 31 of course also rotates within the bearing 33. The bore 38 is thereupon placed out of communication with respect to the port 37 as best shown in Fig. 6 and the bore 40 is placed in communication with the air opening 39. Vacuum to the diaphragm chamber 27 thus ceases and atmosphere enters through the port 39, the bore 40, and through the conduit 41 and its connection 42 with the diaphragm chamber 27.

The container 20 remains in its first position until the liquid level within chamber 22 rises to a predetermined position whereupon the float 49 engages the contact plate 48, thereby urging the arm 47 upwardly. The shaft 44 is thereupon rotated and by referring to Fig. 4 it can be seen that rotation of the shaft 44 will result in registry of the bore 51 with the port 50. When the bore 51 is in registry with the port 50 vacuum communication is established between the chamber 12 and the diaphragm chamber 26 by means of the flexible conduit 54. When this occurs the air port 52 is out of registry with the bore 53. The vacuum pressure in the diaphragm chamber 26 thereupon will cause the container 20 to return from its first position whereupon communication between the chamber 22 and the inlet 13' ceases and communication between the chamber 22 and the outlet port 18 is established so that the chamber 22 is drained. This position of the container 20 is best shown in Fig. 1.

As the chamber drains the float 49 of course recedes with the liquid level. As the float recedes from the contact 48 the arm 47 is moved downwardly since the spring 68 normally urges the arm 66 downwardly against the lever 62. The relationship of the arms 65 and 66 with respect to the arms 34 and 47 is best shown in Fig. 3. It can be seen here that since the spring 68 tends to jack-knife or urge the arms 65 and 66 downwardly this action also urges the arms 34 and 47 back to their original position. Thus the action of the floats 36 and 49 is against the downward pressure exerted by the spring 68.

The quantity of each measuring chamber 22 and 23 is predetermined or known. Thus the number of times each measuring unit is moved is directly related to the quantity of fluid traveling through the flow meter. In order to accurately determine the amount of liquid which is passing through the flow meter the indicating or counting mechanism 60 is provided. Each time either one of the arms 34 or 47 is moved upwardly the link 71 also moves upwardly, thereby rotating the tripping lever 72. Each time the tripping lever 72 is moved the counter 73 is actuated, thus indicating the number of times the measuring unit 19 is moved which in turn accurately indicates the amount of liquid which has traveled through the pipe line milking system.

It can readily be appreciated that an accurate tabulation of the liquid flow is thus presented since in each instance the measuring chambers 22 and 23 are completely emptied before a subsequent movement of the measuring unit takes place. The unit is inexpensive in operation since it derives its power from the vacuum which is normally a part of any pipe line milking system. The unit effectively measures the liquid flow of such a pipe line milking system without any exposure of the milk to the atmosphere. Thus the chances of contamination of the milk are clearly reduced while still achieving an accurate tabulation of the milk flow.

It is believed that applicants have set forth a concise and accurate description of the invention including a clear disclosure of the operation. It must be understood of course that only a preferred embodiment has been shown and that changes may be made in the construction which do not depart from the spirit of the invention as disclosed nor the scope thereof as defined in the appended claims.

What is claimed is:

1. A flow metering device comprising a casing having a fluid inlet end, a wall on said casing provided with a pair of spaced outlet ports, a measuring unit open at opposite ends supported for sliding movement with respect to said wall, said unit including a pair of adjacently positioned measuring chambers, each chamber being adapted to alternately receive fluid through the inlet end of the casing during a first position and to move to a second position wherein communication with the inlet end ceases and communication with one of said outlet ports in established to drain said measuring chamber, and a pair of pressure responsive diaphragms respectively connected to opposite sides of the measuring unit and to opposite sides of the casing, the diaphragms each having a vacuum connection adapted to alternately place said diaphragms under vacuum whereupon movement of said diaphragms moves said measuring unit to and from the first and second positions.

2. A flow metering device comprising a casing having a fluid inlet end, a wall on said casing provided with a pair of spaced outlet ports, a measuring unit open at opposite ends supported for sliding movement with respect to said wall, said unit including a pair of adjacently positioned measuring chambers, each chamber being adapted to alternately receive fluid through the inlet end of the casing during a first position and to move to a second position wherein communication with the inlet end ceases and communication with one of said outlet ports is established to drain said measuring chamber, a pair of pressure responsive diaphragms respectively connected to opposite sides of the measuring unit and to opposite sides of the casing, the diaphragms each having a vacuum connection adapted to alternately place said diaphragms under vacuum whereupon movement of said diaphragms moves said measuring unit to and from the first and second positions, and indicating means connected to the casing and responsive to the movement of the measuring unit, for tabulating the number of times said measuring unit is moved in response to movement of said diaphragms.

3. A flow metering device comprising a casing having a fluid inlet end, a wall on said casing provided with an outlet port, a measuring unit open at opposite ends supported for sliding movement with respect to said wall, said unit including a measuring chamber, the chamber being arranged to receive fluid through the inlet end of the casing during a first position and to move to a second position wherein communication with the inlet end ceases and communication with the outlet port is established to drain said measuring chamber, a pressure responsive diaphragm having one side connected to the measuring unit and another side connected to the casing, a vacuum connection in communication with said diaphragm for placing the diaphragm under vacuum thereby actuating the diaphragm for moving the measuring unit to one of the positions, and indicating means connected to the casing, said indicating means being responsive to the movement of the measuring unit, for tabulating the number of times said measuring unit is moved in response to movement of said diaphragm.

4. A flow metering device comprising a casing having a fluid inlet end, a wall on said casing provided with an outlet port, a measuring unit open at opposite ends supported for sliding movement with respect to said wall, said unit including a measuring chamber, the chamber being arranged to receive fluid through the inlet end of the casing during a first position and to move to a second position wherein communication with the inlet end ceases and communication with the outlet port is established to drain said measuring chamber, and a pressure responsive diaphragm having one side connected to the measuring unit and another side connected to the casing, a vacuum connection in communication with said diaphragm for placing said diaphragm under vacuum and for actuating the diaphragm thereby moving the measuring unit to one of the positions.

5. A flow metering device comprising a casing having a fluid inlet end, a wall on said casing provided with an outlet port, a measuring unit open at opposite ends supported for sliding movement with respect to said wall, said unit including a measuring chamber, the chamber being arranged to receive fluid through the inlet end of the casing during a first position and to move to a second position wherein communication with the inlet end ceases and communication with the outlet port is established to drain said measuring chamber, a pressure responsive diaphragm having one side connected to the measuring unit and another side connected to the casing, a vacuum connection in communication with said diaphragm, a valve mechanism for regulating the vacuum through the vacuum connection whereby said diaphragm is intermittently collapsed and said measuring unit is moved from the first to the second positions, means for operating said valve mechanism including a float in said measuring chamber, a float being positioned to rise and recede with the liquid level in said chamber, means connected to said valve mechanism and engageable by said float during a predetermined rise in the liquid level in said measuring chamber, and indicating means connected to the casing and being responsive to movement of the measuring unit for tabulating the number of times said measuring unit is moved in response to said diaphragm.

6. A flow metering device comprising a casing having a fluid inlet opening, a wall in said casing having an outlet port, a measuring unit slidable on said wall, said unit including a measuring chamber, the chamber being arranged to receive fluid from the inlet opening in a first position and to move to a second position wherein communication with the chamber and the inlet opening ceases and communication with the outlet port is established to drain said chamber, and a pressure responsive means having one end connected to said measuring unit, means stationarily connecting the other end of said pressure responsive means adjacent to said measuring unit, and means connected to said pressure responsive means for actuating the same thereby moving said measuring unit from the first to the second positions.

7. A flow metering device adapted to be connected to a vacuum operated piping system comprising a casing having a vacuum chamber and an inlet opening, a wall in said casing having an outlet port, a measuring unit slidable on said wall, said unit including a measuring chamber, the chamber being arranged to receive fluid from the inlet opening in a first position and to move to a second position wherein communication with the inlet opening ceases and communication with the outlet opening is established to drain said chamber, means for moving said measuring unit including a pressure responsive diaphragm connected to the unit, a vacuum connection in communication with the diaphragm and the vacuum chamber, and valve means responsive to the liquid level within the measuring chamber for regulating the vacuum connection.

8. A flow metering device comprising a casing having a fluid inlet end, a wall on said casing provided with an outlet port, a measuring unit open at opposite ends supported for sliding movement with respect to said wall, said unit including a measuring chamber, the chamber being arranged to receive fluid through the inlet end of the casing during a first position and to move to a second position wherein communication with the inlet end ceases and communication with the outlet port is established to drain said measuring chamber, a pressure responsive diaphragm having one side connected to the measuring unit and another side connected to the casing, a vacuum connection in communication with said diaphragm, a valve mechanism for regulating the vacuum in said vacuum connection whereby said diaphragm is intermittently collapsed and said measuring unit is moved from the first to the second positions, means for operating said valve mechanism including a float in said measuring chamber, the float being arranged to rise and recede with the liquid level in said chamber, and means connected to said valve mechanism and engageable by said float during a predetermined rise in the liquid level whereby the valve mechanism is operated.

9. A flow metering device comprising a casing adapted to be connected to a pipe line system, said casing having a fluid inlet port and a wall provided with a pair of spaced outlet parts, a measuring unit open at opposite ends supported for sliding movement with respect to said wall, said unit including a pair of adjacently positioned measuring chambers, each chamber being adapted to alternately communicate with said inlet port to be filled with a quantity of fluid in a first position and to move to a second position wherein communication between one of said chambers and said inlet port ceases and communication with one of said outlet ports is established to drain said measuring chamber, means for alternately moving each chamber into the first and second positions comprising a pair of pressure responsive diaphragms connected to opposite sides of the measuring unit and to said casing, said diaphragms forming first and second diaphragm chambers, means for alternately inflating and deflating each diaphragm comprising first and second valve mechanisms, each mechanism including a vacuum connection and an atmosphere connection in communication with one of the respective diaphragm chambers, a valve member movable for connecting each diaphragm chamber either to the vacuum connection or to the atmosphere connection, means for actuating the valve member of each valve mechanism whereby the diaphragms are actuated for moving the measuring chambers alternately to the first and second positions, said means including first and second floats respectively provided in each measuring chamber, each float being arranged to rise and to recede with the liquid level in each chamber, and means adapted to connect each float with each valve upon a predetermined level of liquid within each measuring chamber whereby each valve mechanism is actuated to alternately subject each diaphragm chamber to vacuum and atmosphere thereby alternately collapsing each diaphragm.

10. A flow metering device comprising a casing adapted to be connected to a pipe line system, said casing having a fluid inlet port and a wall provided with a pair of spaced outlet ports, a measuring unit open at opposite ends supported for sliding movement with respect to said wall, said unit including a pair of adjacently positioned measuring chambers, each chamber being adapted to alternately communicate with said inlet port to be filled with a quantity of fluid in a first position and to move to a second position wherein communication between one of said chambers and said inlet port ceases and communication with one of said outlet ports is established to drain said measuring chamber, means for alternately moving each chamber into the first and second position comprising a pair of diaphragms connected to opposite sides of the measuring unit and to said casing, said diaphragms forming first and second diaphragm chambers, means for alternately inflating and deflating each diaphragm comprising first and second valve mechanisms, each mechanism including a vacuum connection and an atmosphere connection in communication with one of the respective diaphragm chambers, a valve member movable for connecting each diaphragm chamber either to the vacuum connection or to the atmosphere connection, means for actuating the valve member of each valve mechanism whereby the diaphragms are actuated alternately for moving the measuring chambers to the first and second positions, said means including first and second floats respectively provided in each measuring chamber, each float being arranged to rise and to recede with the liquid level in each chamber, means adapted to connect each float with each valve upon a predetermined level of liquid within each measuring chamber whereby each valve mechanism is actuated to alternately subject each diaphragm chamber to vacuum and atmosphere, thereby alternately collapsing each diaphragm, and indicating means connected to the casing and being responsive to movement of the measuring unit, for tabulating the number of times said diaphragms effect movement of said measuring unit.

11. A flow metering device comprising a casing adapted to be connected to a pipe line system, said casing having a fluid inlet port and a wall provided with a pair of spaced outlet ports, a measuring unit open at opposite ends supported for sliding movement with respect to said wall, said unit including a pair of adjacently positioned measuring chambers, each chamber being adapted to alternately communicate with said inlet port to be filled with a quantity of fluid in a first position and to move to a second position wherein communication between one of said chambers and said inlet port ceases, and communication with one of said outlet ports is established to drain said measuring chamber, means for alternately moving each chamber into the first and second position comprising a pair of diaphragms disposed at opposite sides of the measuring unit, said diaphragms forming first and second diaphragm chambers, means for alternately inflating and deflating each diaphragm comprising first and second valve mechanisms, each mechanism including a vacuum connection, an atmosphere connection in communication with one of the respective diaphragm chambers, a valve member movable for connecting each diaphragm chamber either to the vacuum connection or to the atmosphere connection, means for actuating the valve member of each valve mechanism whereby the diaphragms are actuated alternately for moving the measuring chambers to the first and second positions, said means including first and second floats respectively provided in each measuring chamber, each float being arranged to rise and to recede with the liquid level in each chamber, each float being engageable with each valve upon a predetermined level of liquid within each measuring chamber whereby each valve mechanism is responsively actuated to alternately subject each diaphragm to vacuum and atmosphere, thereby alternately collapsing each diaphragm, and indicating means connected to said casing and being responsive to movement of said measuring unit, for tabulating the number of times said diaphragms effect movement of said measuring unit.

12. A flow metering device comprising a casing adapted to be connected to a pipe line system, said casing having a fluid inlet port and a wall provided with a pair of spaced outlet ports, a measuring unit open at opposite ends supported for sliding movement with respect to said wall, said unit including a pair of adjacently positioned measuring chambers, each chamber being adapted to alternately communicate with said inlet port to be filled with a quantity of fluid in a first position and to move to a second position wherein communication between one of said chambers and said inlet port ceases, and communication with one of said outlet ports is established to drain said measuring chamber, means for alternately moving each chamber into the first and second position comprising a pair of diaphragms connected to opposite sides of the measuring unit and to said casing, said diaphragms forming first and second diaphragm chambers, means for alternately inflating and deflating each diaphragm comprising first and second valve mechanisms, each mechanism including a pressure connection and an atmosphere connection in communication with one of the respective diaphragms, a valve member movable for connecting said diaphragm either to the pressure connection or to the atmosphere connection, means for actuating the valve members of each valve mechanism whereby the diaphragms are alternately inflated for moving the measuring chambers to the first and second positions, said means including first and second arms connected respectively to the valve members and respectively projecting into the measuring chambers, first and second floats respectively provided in each measuring chamber, each float being arranged to rise and to recede with the liquid level in each chamber, the floats being adapted to engage and move the arms upon a predetermined level of liquid within each measuring chamber whereby each valve mechanism is responsively actuated to alternately subject each diaphragm to pressure and atmosphere thereby alternately inflating and deflating said diaphragm.

WILLIAM H. HARSTICK.
HAROLD W. HEIN.

REFERENCES CITED

The following references are of record in the file of this patent:

UNITED STATES PATENTS

| Number | Name | Date |
| --- | --- | --- |
| 391,072 | Peasley | Oct. 16, 1888 |
| 2,457,710 | Norbom | Dec. 28, 1948 |